(12) United States Patent
Gao

(10) Patent No.: US 11,209,689 B2
(45) Date of Patent: Dec. 28, 2021

(54) DISPLAY PANEL

(71) Applicant: Wuhan China Star Optoelectronics Technology Co., Ltd., Wuhan (CN)

(72) Inventor: Ling Gao, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 146 days.

(21) Appl. No.: 16/464,293

(22) PCT Filed: Mar. 21, 2019

(86) PCT No.: PCT/CN2019/078998
§ 371 (c)(1),
(2) Date: May 28, 2019

(87) PCT Pub. No.: WO2020/087843
PCT Pub. Date: May 7, 2020

(65) Prior Publication Data
US 2020/0301196 A1 Sep. 24, 2020

(30) Foreign Application Priority Data
Oct. 30, 2018 (CN) .......................... 201811278315.7

(51) Int. Cl.
| G02F 1/1335 | (2006.01) |
| G02F 1/1337 | (2006.01) |
| G02F 1/1339 | (2006.01) |
| G02F 1/1368 | (2006.01) |

(52) U.S. Cl.
CPC ...... *G02F 1/133512* (2013.01); *G02F 1/1337* (2013.01); *G02F 1/1368* (2013.01); *G02F 1/13394* (2013.01); *G02F 1/133514* (2013.01)

(58) Field of Classification Search
CPC ......... G02F 1/133512; G02F 1/133514; G02F 1/1337; G02F 1/13394; G02F 1/1368; G02F 2201/46; G02F 1/1333
See application file for complete search history.

(56) References Cited

U.S. PATENT DOCUMENTS

| 2012/0019748 A1 | 1/2012 | Kim et al. |
| 2015/0060848 A1* | 3/2015 | Sasagawa ........... H01L 27/1225 257/43 |
| 2015/0155362 A1* | 6/2015 | Nakazawa ............. H01L 29/45 257/43 |

(Continued)

FOREIGN PATENT DOCUMENTS

| CN | 102346339 | 2/2012 |
| CN | 104252062 | 12/2014 |

*Primary Examiner* — Edward Chin

(57) ABSTRACT

A display panel includes a first substrate, a second substrate, and spacers. The first substrate includes a light-shielding layer having a matrix portion and widened portions, and each widened portion is disposed at an intersection of at least one column and at least one row of the matrix portion. The second substrate is disposed opposite to the first substrate. The spacers are disposed on the first substrate. Each spacer is covered with each widened portion respectively, and an end of each spacer abuts against a surface of the second substrate. A slidable scope on the surface of the second substrate, within which the end of each spacer abuts against the second substrate, is not greater than coverage of a corresponding widened portion.

12 Claims, 2 Drawing Sheets

(56) References Cited

U.S. PATENT DOCUMENTS

| | | | |
|---|---|---|---|
| 2015/0253607 A1* | 9/2015 | Cho | G02F 1/13394 |
| | | | 349/110 |
| 2016/0154265 A1* | 6/2016 | Cai | G02F 1/13394 |
| | | | 257/72 |
| 2016/0336412 A1* | 11/2016 | Hung | H01L 29/66636 |
| 2019/0162884 A1* | 5/2019 | Dong | G02F 1/1339 |
| 2020/0350403 A1* | 11/2020 | Basker | H01L 29/1037 |

\* cited by examiner

DISPLAY PANEL

RELATED APPLICATIONS

This application is a National Phase of PCT Patent Application No. PCT/CN2019/078998 having International filing date of Mar. 21, 2019, which claims the benefit of priority of Chinese Patent Application No. 201811278315.7 filed on Oct. 30, 2018. The contents of the above applications are all incorporated by reference as if fully set forth herein in their entirety.

FIELD AND BACKGROUND OF THE INVENTION

The present disclosure relates to the field of display technology, and more particularly, to a display panel.

When a liquid crystal panel is under stress testing, photo spacers may slide and damage an alignment layer on an array substrate by scratching. In general, the photo spacers are disposed under a black matrix and covered with the black matrix. However, light leakage occurs in a position of damage by scratching, and then spots are formed while a slidable scope of the photo spacers is greater than a sheltering scope of the black matrix. When spots occur, display quality of liquid crystal panels is seriously affected.

Therefore, it is necessary to provide a display panel in order to solve the above problems regarding spots.

SUMMARY OF THE INVENTION

A technical problem is that, light leakage occurs in a position of damage by scratching, and then spots are formed while a slidable scope of photo spacers is greater than a sheltering scope of a black matrix. When spots occur, display quality of liquid crystal panels is seriously affected.

The object of the present disclosure is to provide a display panel to effectively improve the problems regarding spots.

In order to realize the above object, the present disclosure provides a display panel, including:

a first substrate, including a light-shielding layer and a plurality of sub-pixel areas formed on the light-shielding layer, wherein the light-shielding layer has a matrix portion and a plurality of widened portions, wherein each of the plurality of widened portions is disposed at an intersection of at least one column and at least one row of the matrix portion, and wherein each of the plurality of sub-pixel areas, adjacent to the each of the plurality of widened portions, has a concave portion adjacent to a corresponding widened portion;

a second substrate disposed opposite to the first substrate, wherein the second substrate includes an alignment layer formed on a surface of the second substrate; and a plurality of spacers disposed on the first substrate, wherein each of the plurality of spacers is covered with the each of the plurality of widened portions respectively, and wherein an end of the each of the plurality of spacers abuts against the surface of the second substrate;

wherein a slidable scope on the surface of the second substrate, within which the end of the each of the plurality of spacers abuts against the second substrate, is not greater than coverage of a corresponding widened portion.

In some embodiments, the each of the plurality of widened portions has a shape of a circle, a rectangle, or an ellipse.

In some embodiments, the first substrate is a color filter.

In some embodiments, the second substrate is a thin-film transistor substrate.

In some embodiments, the concave portion is an arc, a right angle, an acute angle, an obtuse angle, a sawtooth, or irregular-shaped.

In order to realize the above object, the present disclosure provides a display panel, including: a first substrate, including a light-shielding layer having a matrix portion and a plurality of widened portions, wherein each of the plurality of widened portions is disposed at an intersection of at least one column and at least one row of the matrix portion;

a second substrate disposed opposite to the first substrate; and a plurality of spacers disposed on the first substrate, wherein each of the plurality of spacers is covered with the each of the plurality of widened portions respectively, and wherein an end of the each of the plurality of spacers abuts against a surface of the second substrate;

wherein a slidable scope on the surface of the second substrate, within which the end of the each of the plurality of spacers abuts against the second substrate, is not greater than coverage of a corresponding widened portion.

In some embodiments, the each of the plurality of widened portions has a shape of a circle, a rectangle, or an ellipse.

In some embodiments, the second substrate includes an alignment layer formed on the surface of the second substrate.

In some embodiments, the first substrate is a color filter.

In some embodiments, the second substrate is a thin-film transistor substrate.

In some embodiments, the first substrate further includes a plurality of sub-pixel areas formed on the light-shielding layer, and wherein each of the plurality of sub-pixel areas, adjacent to the each of the plurality of widened portions, has a concave portion adjacent to a corresponding widened portion.

In some embodiments, the concave portion is an arc, a right angle, an acute angle, an obtuse angle, a sawtooth, or irregular-shaped.

The beneficial effect of the present disclosure is that, a display panel is provided to effectively improve the problems regarding spots.

BRIEF DESCRIPTION OF THE SEVERAL VIEWS OF THE DRAWINGS

To ensure the features and the technical content of the disclosure are more apparent and easier to understand, please refer to the explanation and the accompanying drawings of the disclosure as follows. However, the accompanying drawings are merely for reference without limiting the disclosure.

DESCRIPTION OF SPECIFIC EMBODIMENTS OF THE INVENTION

To ensure the objects, the technical solutions, and the effects of the disclosure are clearer and more specific, the disclosure will be explained in conjunction with the accompanying drawings in detail further below. It should be understood that the embodiments described herein are merely a part of the embodiments of the present disclosure instead of all of the embodiments and not used to limit the disclosure.

Figure 1:
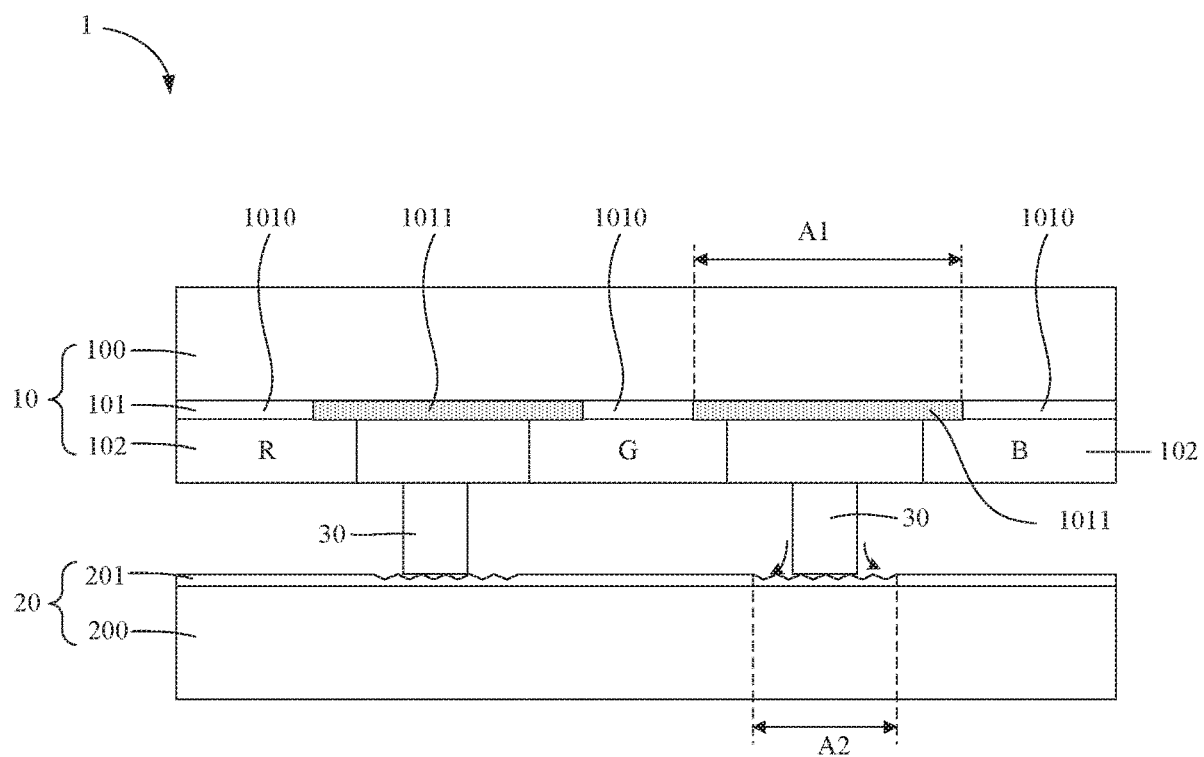
FIG. 1 is a cross-sectional view of a display panel according to an embodiment of the present disclosure.

Please refer to FIG. 1, which is a cross-sectional view of a display panel according to an embodiment of the present disclosure. A display panel 1 includes a first substrate 10, a second substrate 20, and a plurality of spacers 30. The first substrate 10 includes a transparent substrate 100 and a light-shielding layer 101. In an embodiment of the present disclosure, the first substrate 10 is a color filter and further includes a plurality of sub-pixel areas 102 formed on the light-shielding layer 101.

As shown in FIG. 1, the second substrate 20 is disposed opposite to the first substrate 10. In an embodiment of the present disclosure, the second substrate 20 includes a transparent substrate 200 and an alignment layer 201 formed on a surface of the second substrate 20. Furthermore, the second substrate 20 is a thin-film transistor substrate.

Continuing to refer to FIG. 1, a plurality of spacers 30 are disposed on the first substrate 10. Each spacer 30 is covered with the light-shielding layer 101, and an end of each spacer 30 abuts against a surface of the second substrate 20. In addition, each spacer 30 slides on the surface of the second substrate 20, and then a rough surface is formed.

Figure 2:
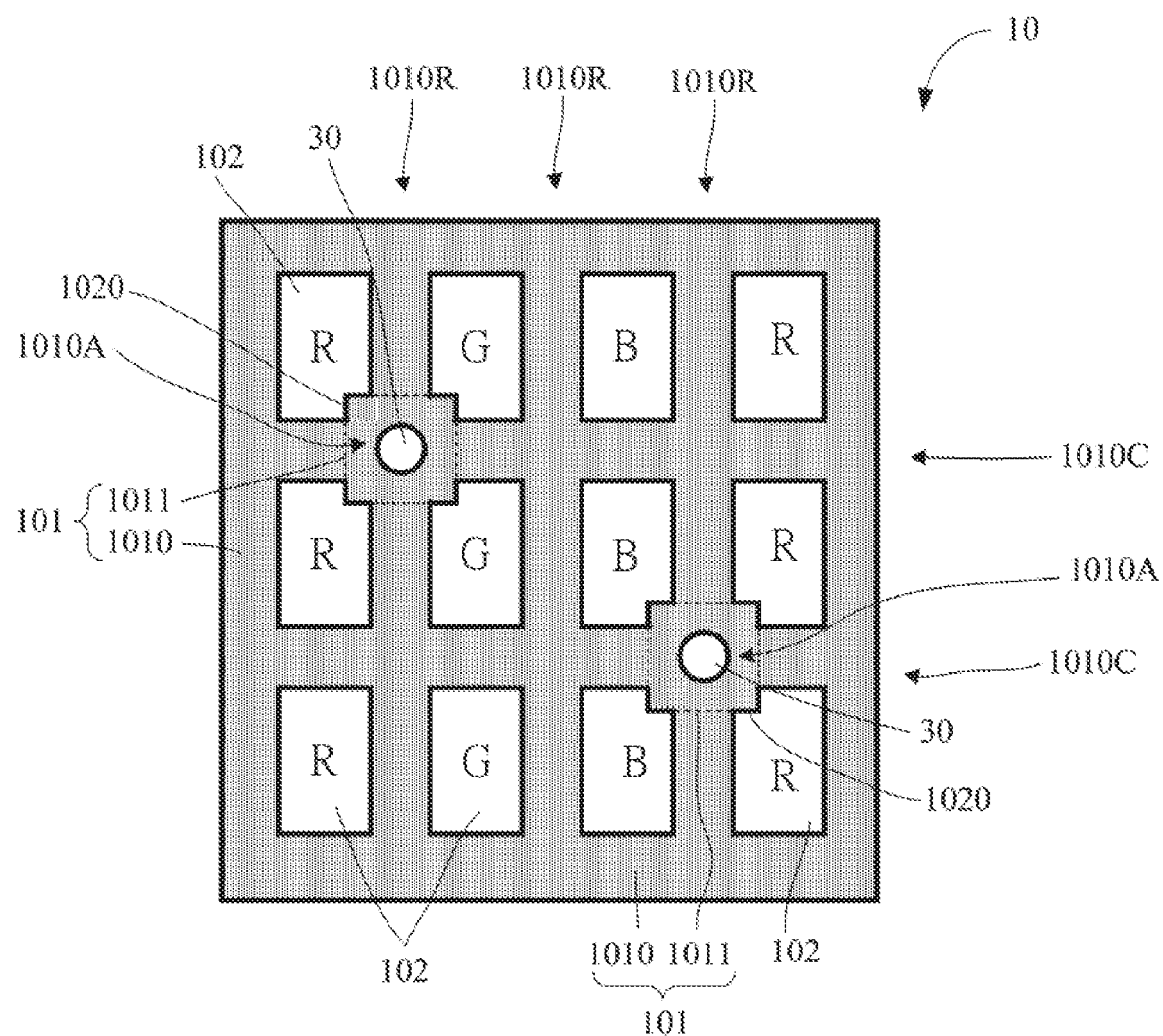
FIG. 2 is a top view of a first substrate of a display panel according to FIG. 1.

FIG. 2 is a top view of a first substrate of a display panel according to FIG. 1. For the convenience of explaining, in FIG. 2, part of components of the first substrate 10 are omitted. As shown in FIG. 2, the light-shielding layer 101 has a matrix portion 1010 and a plurality of widened portions 1011 whose scope is marked by dotted lines. In an embodiment of the present disclosure, each widened portion 1011 is disposed at an intersection of at least one column 1010R and at least one row 1010C of the matrix portion 1010. Specifically, the widened portions 1011 has, without limitation, a shape of a rectangle. Also, the widened portions 1011 may have a shape of a circle or an ellipse.

Further, as shown in FIG. 2, each spacer 30 is covered with each widened portion 1011 of the light-shielding layer 101 respectively. Furthermore, each sub-pixel area 102, adjacent to each widened portion 1011, has a concave portion 1020 adjacent to a corresponding widened portion 1011. In an embodiment of the present disclosure, the concave portion 1020 is, but not limited to, a right angle. Also, the concave portion 1020 may be an arc, an acute angle, an obtuse angle, a sawtooth shape, or an irregular shape.

Further, combining FIG. 1 and FIG. 2 to explain the present disclosure below. As shown in FIG. 2, the dotted-line scope of the widened portion 1011 is coverage A1 of the widened portion 1011. In FIG. 2, it can also be observed that a slidable scope A2 on the surface of the second substrate 20, within which the end of each spacer 30 abuts against the second substrate 20, is not greater than coverage A1 of a corresponding widened portion 1011. Therefore, the widened portion 1011 can effectively shelter a rough surface (i.e., the slidable scope A2), produced by the spacer 30, on the second substrate 20.

In conclusion, the present disclosure provides a display panel mainly by disposing widened portions in a light-shielding layer so that a slidable scope of a spacer is within coverage of a widened portion, and thus the occurrence of spots is prevented.

It should be understood that the application of the present disclosure is not limited by the foregoing examples. A person of ordinary skill in the art is able to make modifications or changes based on the foregoing description, and all of these modifications and changes are within the scope of the appended claims of the present disclosure.

The industrial applicability of the present disclosure is that, a display panel is mainly provided by disposing widened portions in a light-shielding layer so that a slidable scope of a spacer is within coverage of a widened portion, and thus the occurrence of spots is prevented.

What is claimed is:

1. A display panel, comprising:
a first substrate comprising a plurality of color filters, a light-shielding layer, and a plurality of sub-pixel areas formed on the light-shielding layer, wherein the light-shielding layer has a matrix portion and a plurality of widened portions, wherein each of the plurality of widened portions partially covers a surface of the plurality of color filters closest to the first substrate, each of the plurality of widened portions is disposed at an intersection of at least one column and at least one row of the matrix portion, and the matrix portion surrounds each of the plurality of sub-pixel areas, and wherein each of the plurality of sub-pixel areas, adjacent to the each of the plurality of widened portions, has a concave portion adjacent to a corresponding widened portion;
a second substrate disposed opposite to the first substrate, wherein the second substrate comprises an alignment layer formed on a surface of the second substrate; and
a plurality of spacers disposed on the first substrate and slidably disposed on the second substrate, wherein each of the plurality of spacers is covered with the each of the plurality of widened portions respectively, and wherein an end of the each of the plurality of spacers abuts against the surface of the second substrate; wherein
a slidable scope on the surface of the second substrate, within which the end of the each of the plurality of spacers abuts against the second substrate, is not greater than coverage of a corresponding widened portion.

2. The display panel of claim 1, wherein the each of the plurality of widened portions has a shape of a circle, a rectangle, or an ellipse.

3. The display panel of claim 1, wherein the first substrate is a color filter.

4. The display panel of claim 3, wherein the second substrate is a thin-film transistor substrate.

5. The display panel of claim 1, wherein the concave portion is an arc, a right angle, an acute angle, an obtuse angle, a sawtooth shape, or an irregular shape.

6. A display panel, comprising:
a first substrate comprising a plurality of color filters, a light-shielding layer, and a plurality of sub-pixel areas formed on the light-shielding layer, wherein the light-shielding layer has a matrix portion and a plurality of widened portions, wherein the matrix portion surrounds each of the plurality of sub-pixel areas, each of the plurality of widened portions partially covers a surface of the plurality of color filters closest to the first substrate, and each of the plurality of widened portions is disposed at an intersection of at least one column and at least one row of the matrix portion;
a second substrate disposed opposite to the first substrate; and
a plurality of spacers disposed on the first substrate and slidably disposed on the second substrate, wherein each of the plurality of spacers is covered with the each of the plurality of widened portions respectively, and wherein an end of the each of the plurality of spacers abuts against a surface of the second substrate; wherein a slidable scope on the surface of the second substrate, within which the end of the each of the plurality of spacers abuts against the second substrate, is not greater than coverage of a corresponding widened portion.

7. The display panel of claim 6, wherein the each of the plurality of widened portions has a shape of a circle, a rectangle, or an ellipse.

8. The display panel of claim 6, wherein the second substrate comprises an alignment layer formed on the surface of the second substrate.

9. The display panel of claim 6, wherein the first substrate is a color filter.

10. The display panel of claim 9, wherein the second substrate is a thin-film transistor substrate.

11. The display panel of claim 6, wherein the first substrate further comprises a plurality of sub-pixel areas formed on the light-shielding layer, and wherein each of the plurality of sub-pixel areas, adjacent to the each of the plurality of widened portions, has a concave portion adjacent to a corresponding widened portion.

12. The display panel of claim 11, wherein the concave portion is an arc, a right angle, an acute angle, an obtuse angle, a sawtooth shape, or an irregular shape.

\* \* \* \* \*